US007911160B2

(12) United States Patent
Watanabe

(10) Patent No.: US 7,911,160 B2
(45) Date of Patent: Mar. 22, 2011

(54) OSCILLATION DEVICE, OPTICAL DEFLECTION APPARATUS, AND DRIVE-SIGNAL GENERATING METHOD

(75) Inventor: Ikuo Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 12/101,096

(22) Filed: Apr. 10, 2008

(65) Prior Publication Data

US 2008/0284359 A1  Nov. 20, 2008

(30) Foreign Application Priority Data

May 17, 2007  (JP) .................. 2007-131352

(51) Int. Cl.
*H02P 6/00* (2006.01)
(52) U.S. Cl. .......... 318/129; 318/119; 318/126; 310/36; 310/40.5
(58) Field of Classification Search .................. 318/119, 318/126, 129; 310/36, 40.5; 359/199.1, 359/213.1, 330
See application file for complete search history.

(56) References Cited

U.S. PATENT DOCUMENTS

| 4,317,611 A | 3/1982 | Petersen ........................ 380/6.6 |
| 4,859,846 A * | 8/1989 | Burrer ........................... 250/234 |
| 5,047,630 A * | 9/1991 | Confer et al. .................. 250/235 |
| 6,803,843 B2 * | 10/2004 | Kato et al. ....................... 335/78 |
| 6,961,257 B2 | 11/2005 | Garvreick et al. .............. 365/49 |
| 7,088,070 B2 | 8/2006 | Hagen ........................... 318/603 |
| 7,474,165 B2 * | 1/2009 | Kato et al. ..................... 331/176 |
| 2006/0152785 A1 | 7/2006 | Yasuda et al. .................. 359/199 |
| 2006/0243886 A1 | 11/2006 | Nomura et al. ............. 250/208.1 |
| 2007/0008600 A1 | 1/2007 | Okada ........................... 359/199 |

FOREIGN PATENT DOCUMENTS

| JP | 57-8520 | 1/1982 |
| JP | 2-216583 | 8/1990 |
| JP | 9-230277 | 9/1997 |
| JP | 2005-292627 | 10/2005 |

* cited by examiner

*Primary Examiner* — Walter Benson
*Assistant Examiner* — David S Luo
(74) *Attorney, Agent, or Firm* — Fitzpatrick, Cella, Harper & Scinto

(57) ABSTRACT

An oscillation device capable of generating a drive signal waveform with a sufficiently small number of harmonic components is provided. The oscillation device includes an oscillation system, a supporting unit configured to support the oscillation system, a drive unit configured to drive the oscillation system, and a drive control unit configured to control the drive unit by supplying a drive signal. The oscillation system includes a torsion spring and an oscillator. The drive control unit includes a drive-signal generating circuit configured to generate the drive signal using an address generator configured to generate an address to which a predetermined variable is added at a frequency higher than a frequency of the drive signal and using a trigonometric-function table indexed by an output of the address generator. The frequency of the drive signal is adjusted by adjusting the predetermined variable.

12 Claims, 7 Drawing Sheets

SINE-WAVE TABLE

| ADDRESS | AMPLITUDE |
|---|---|
| 0 | 0 |
| 1 | 0.00009587 |
| 2 | 0.00019175 |
| 3 | 0.00028762 |
| . | . |
| 16384 | 1.00000000 |
| . | . |
| 65535 | -0.00009587 |

OSCILLATION DEVICE, OPTICAL DEFLECTION APPARATUS, AND DRIVE-SIGNAL GENERATING METHOD

BACKGROUND OF THE INVENTION

1. Field of the Invention

The present invention relates to a technical field of an oscillation device including an oscillator such as a micro-oscillation member. More specifically, the present invention relates to an oscillation device configured to generate a drive signal for driving an oscillator, an optical deflection apparatus including the oscillation device, and a drive-signal generating method for generating a drive signal in the oscillation device. Examples of such an optical deflection apparatus, which include the oscillation device, include image forming apparatuses such as a projector, a scanning display, an image display apparatus, a printer such as a laser beam printer (LBP), and a digital copier.

2. Description of the Related Art

An existing resonant optical deflection apparatus in which mirrors are driven by resonance is often advantageous over a light-scanning optical system including a rotatable multi-facet mirror such as a polygonal mirror. For example, the size of the optical deflection apparatus can be significantly reduced, power consumption is low, and no facet-to-facet angle mismatch occurs in theory. In particular, an optical deflection apparatus made of Si single crystal, which is manufactured by a semiconductor process, theoretically has no metal fatigue and is excellent in durability (see Japanese Patent Laid-Open No. 57-8520, corresponding to U.S. Pat. No. 4,317,611).

In the resonant optical deflection apparatus, however, in principle, mechanical Q-factor is high so that a deviation between a resonant frequency and a frequency of a drive signal causes a large reduction in drive efficiency, with a consequent reduction in oscillation angle (amplitude) of a deflection mirror. A proposal to address this problem is disclosed in Japanese Patent Laid-Open No. 2005-292627. In this proposal, when a light beam reflected by the deflection mirror is scanned and passes through a predetermined position, a time at which the light beam passes through the predetermined position is detected using a position-detection signal generator including a light-receiving element. A variance table is referred to by a value indicating the number of clocks by which the detected time is deviated from a target time to adjust the drive signal, and the oscillation amplitude and frequency of the deflection mirror are corrected.

U.S. Patent Application Publication No. 2006/0152785 and U.S. Pat. No. 4,859,846 disclose an optical deflection apparatus including two or more oscillators each resonated at either second or third harmonic of a fundamental frequency.

SUMMARY OF THE INVENTION

In the proposal disclosed in Japanese Patent Laid-Open No. 2005-292627, however, since the drive signal has a rectangular waveform and includes a large number of harmonic components, the driving becomes unstable if a sub-resonant frequency of the resonant optical deflection apparatus and a harmonic frequency coincide. In the method described in this proposal, moreover, the harmonic components of the drive signal directly interfere with the second or third harmonic, and it is difficult to apply this method to the optical deflection apparatus disclosed in U.S. Patent Application Publication No. 2006/0152785 or U.S. Pat. No. 4,859,846.

The present invention provides an oscillation device including an oscillation system, a supporting unit configured to support the oscillation system, a drive unit configured to drive the oscillation system, and a drive control unit configured to control the drive unit using a drive signal. The oscillation system includes a torsion spring, and an oscillator connected to the torsion spring and movable about a torsion axis. The drive unit drives the oscillation system so that the oscillator is oscillated in a manner expressed by an equation containing a periodic function. The drive control unit supplies the drive signal to the drive unit. The drive control unit includes a drive signal generating circuit configured to generate the drive signal using an address generator configured to generate an address to which a predetermined variable is added at a frequency higher than a frequency of the drive signal and using a trigonometric-function table indexed by an output of the address generator. A drive frequency of the drive signal is adjustable by adjusting the predetermined variable.

The present invention further provides a drive-signal generating method for generating a drive signal in an oscillation device, the oscillation device including an oscillation system including a torsion spring and an oscillator connected to the torsion spring and movable about a torsion axis, a drive unit configured to drive the oscillation system, and a drive control unit configured to control the drive unit using a drive signal expressed by an equation containing a periodic function. In the method, an address to which a predetermined variable is added at a frequency higher than a frequency of the drive signal is generated, and a trigonometric-function table indexed on the basis of the address to generate the drive signal.

The present invention further provides an optical deflection apparatus including a light source configured to emit a light beam, and the oscillation device described above, the oscillation device including an optical deflection element configured to deflect the light beam to the oscillator.

The present invention further provides an image forming apparatus, which is an optical apparatus, including the optical deflection apparatus described above and a photosensitive member, wherein the optical deflection apparatus deflects light from the light source and causes at least a portion of the light to be incident on the photosensitive member. The present invention further provides an image display apparatus, which is an optical apparatus, including the optical deflection apparatus described above and an image display unit, wherein the optical deflection apparatus deflects light from the light source, and causes at least a portion of the light to be incident on the image display unit.

In the oscillation device of the present invention, a predetermined variable is added to an address generated by an address generator such as a register at a frequency or clock higher than a frequency of a drive signal. A trigonometric-function table is indexed by an output of the address generator, and an output of the trigonometric-function table is used. Thus, a drive-signal waveform with a sufficiently small number of harmonic components can be generated. Furthermore, according to the drive-signal generating method of the present invention, an address is generated in the manner described above, and a trigonometric-function table is indexed on the basis of the address to generate a drive signal. Thus, a drive-signal waveform with sufficiently less harmonic distortion can be generated. Therefore, the oscillator can be oscillated by such a drive signal with less harmonic distortion, and can be applied to an oscillation device including an oscillation system having a sub-resonant frequency as a harmonic frequency thereof or an oscillation system having two or more oscillators each resonated even at second or third harmonic. Moreover, since the drive frequency of the drive signal is adjustable by adjusting the predetermined variable, a frequency of a generated drive signal can be flexibly adjusted.

Further features of the present invention will become apparent from the following description of exemplary embodiments with reference to the attached drawings.

DESCRIPTION OF THE EMBODIMENTS

Embodiments of the present invention will be described hereinbelow.

First Embodiment

Figure 1:
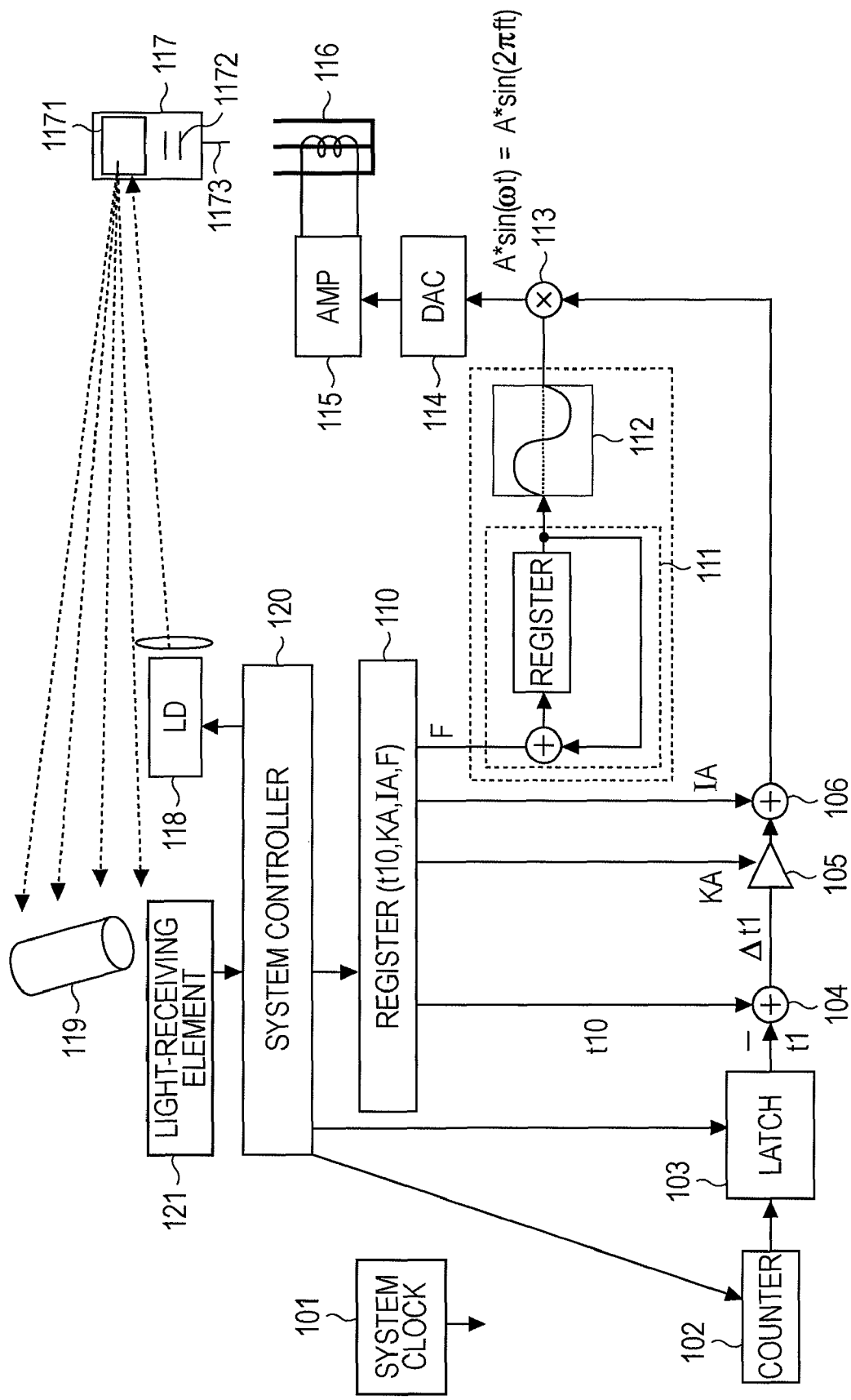
FIG. 1 is a block diagram of a proportional control drive circuit of an optical deflection apparatus according to an embodiment of the present invention.
Figure 2:
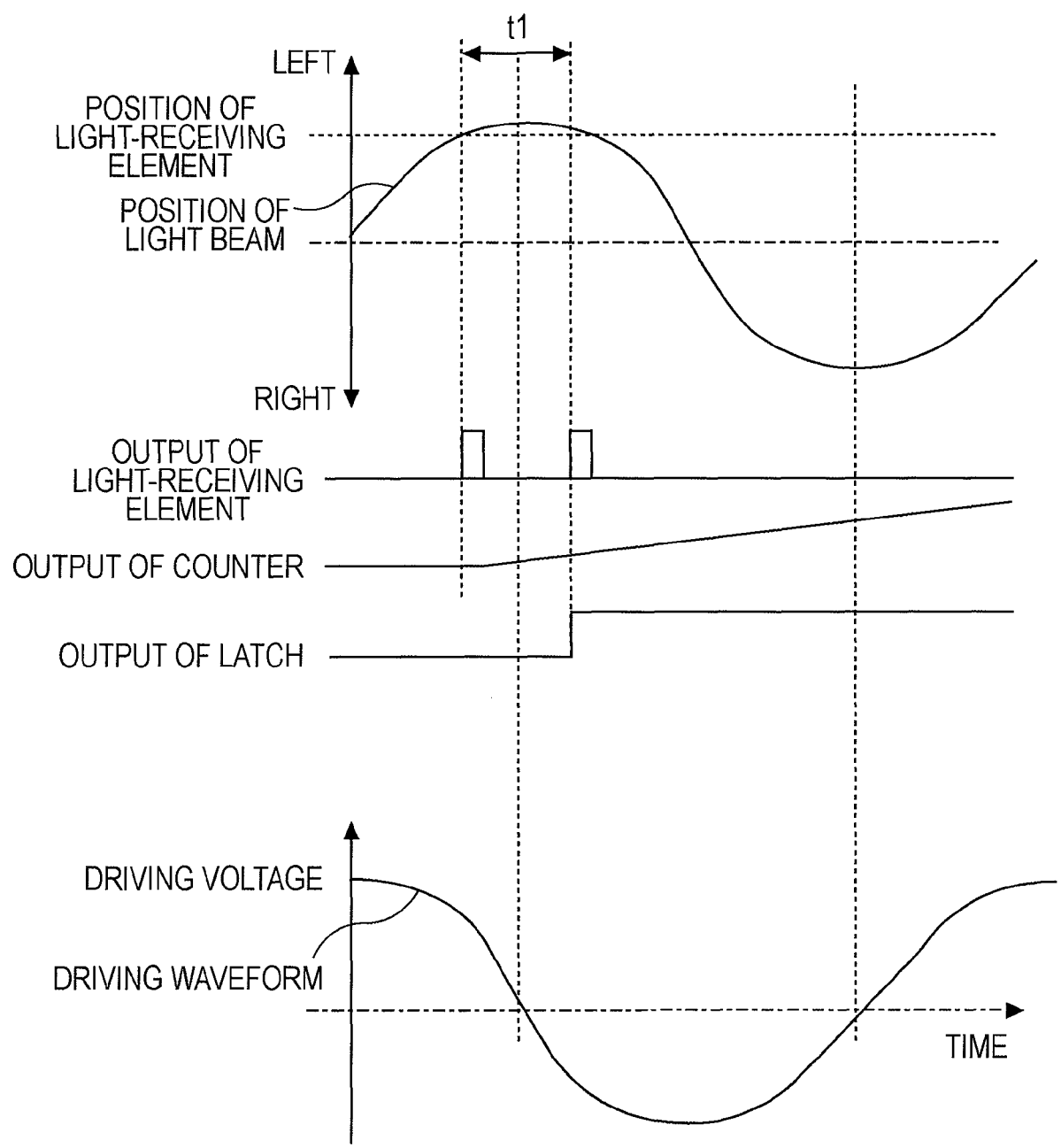
FIG. 2 is a diagram showing a position of a light beam with respect to time and a driving waveform.
Figure 3:
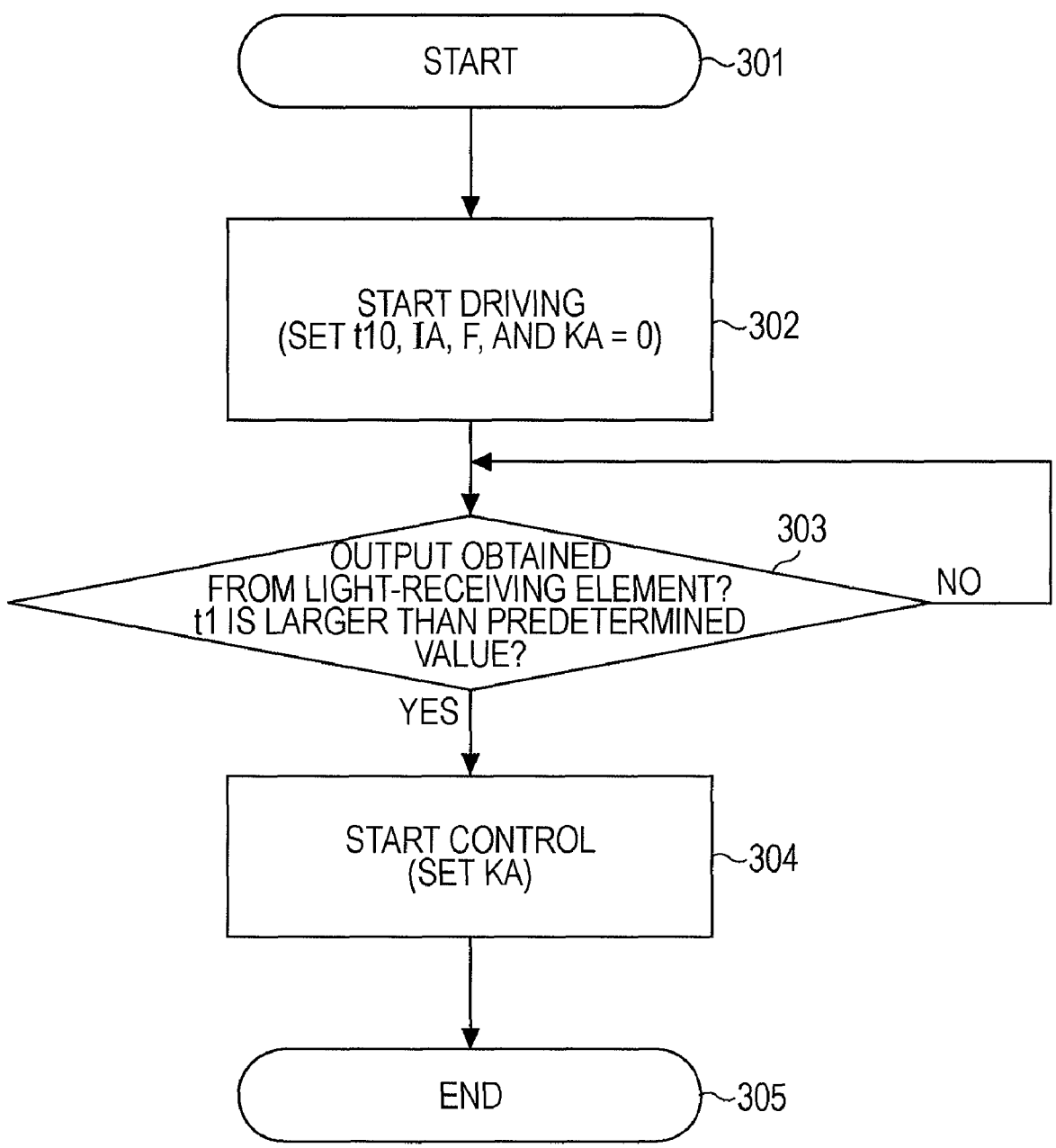
FIG. 3 is a flowchart showing flow from the start of the optical deflection apparatus to proportional control.

FIG. 1 is a block diagram showing an optical deflection apparatus including an oscillation device according to a first embodiment of the present invention, and a drive-signal generating method according to the first embodiment of the present invention. FIG. 2 is a diagram showing a position of a light beam in the optical deflection apparatus of the first embodiment with respect to time, and a waveform of a drive signal. FIG. 3 is a flowchart showing flow from the start of the optical deflection apparatus of the first embodiment to proportional control of the drive signal.

Referring to FIG. 1, in the first embodiment, a drive unit including a drive coil 116 and a permanent magnet 1172 drives an oscillation system including an oscillator 117 provided with a mirror portion 1171, which serves as an optical deflection element, to oscillate the oscillator 117 in a manner given by an equation containing a periodic function. The oscillation system is supported movably with respect to a supporting unit (not shown) by a torsion spring 1173. The oscillator 117 is movably supported about a torsion axis defined by the torsion spring 1173.

A light-receiving element 121, which is a signal output device, outputs a signal in accordance with a displacement (oscillation angle) of the oscillator 117 provided with the mirror portion 1171. A drive control unit including elements 101 to 106, 110 to 115, and 120 generates a drive signal according to the signal output from the light-receiving element 121 so that the amplitude of the periodic function has a predetermined value, and supplies the drive signal to the drive unit. The drive signal is given by an equation containing a periodic function. The drive control unit configured to generate the drive signal includes a drive-signal generating circuit including an address generator 111 and a trigonometric-function table 112 which stores values for a trigonometric function at addresses thereof, and which is indexed by an output of the address generator 111. In this and in other embodiments, the trigonometric function whose values are stored in the table 112 is a sine wave function, but other trigonometric functions or combinations of trigonometric functions are also possible. The address generator 111 is configured to generate an address to which a predetermined variable F is added at a frequency higher than a frequency f of the drive signal. In this manner, the drive control unit includes a drive-signal generating circuit configured to generate a drive signal using an address generator configured to generate an address to which a predetermined variable is added at a frequency higher than a frequency of the drive signal and using a trigonometric-function table connected to an output of the address generator. The drive frequency of the drive signal is adjustable by adjusting the predetermined variable F.

More specifically, in a case where the oscillation system moves at a fundamental oscillation frequency f, the drive control unit can apply a periodic driving force of the fundamental oscillation frequency f to the drive unit. The drive control unit includes the drive-signal generating circuit, and the drive-signal generating circuit is configured to generate a drive signal given by $A \cdot \sin(2\pi ft)$, where A denotes the amplitude and t denotes time, so that the oscillator 117 provided with the mirror portion 1171 is displaced in a designated oscillating manner.

In order to index the trigonometric-function table 112 by the output of the address generator 111 to obtain a drive signal of a desired frequency, according to sampling theorem, sampling is performed at a frequency of at least twice the desired frequency to generate a waveform, thereby generating a drive signal without any problem. This method is effective in a case where the same state continues infinitely from the past to the future with respect to the time axis. In actuality, however, it is desirable that sampling be performed at a frequency that is further about twice that frequency to generate a waveform. The desired frequency of the drive signal is determined by dividing the product of the predetermined variable F and the frequency higher than the frequency f by the number of values stored (number of addresses) in the trigonometric-function table 112:

(predetermined variable $F$)×(higher frequency)/(number of addresses)=(frequency of drive signal)

According to the sampling theorem, therefore, the predetermined variable F is smaller than one-half the number of addresses in the trigonometric-function table 112, and is preferably about one-quarter or less. Further, to increase the number of sampling points for generation per wavelength without changing the number of addresses in the trigonometric-function table 112 to obtain more precise trigonometric functions of desired frequencies, the predetermined variable F is reduced and the frequency higher than the frequency f is increased. In the first embodiment, the predetermined variable F is much smaller than the number of addresses in the trigonometric-function table 112, and the frequency higher than the frequency f is much higher than the frequency f. Thus, high-precision trigonometric functions are obtained.

A further detailed description will be given with reference to FIG. 1. It is assumed here that an angular frequency (first frequency) of the fundamental wave is given by $\omega 1 = 2\pi \cdot 2000$ (Hz). It is also assumed here that a system controller 120 and other elements are operated by an operating clock of 25 MHz, which is supplied from a system clock 101.

In response to an instruction from the system controller 120, a laser diode (LD) 118, which is a light source configured to generate a light beam, emits a light beam. Typically, in an area corresponding to the position of light-receiving element 121, the light beam is on constantly, whereas in an area corresponding to a photosensitive drum 119 serving as a photosensitive member, the light beam is modulated by an image signal. The light beam is reflected by the mirror portion 1171 of the oscillation system and is incident on the light-receiving element 121, which is outside an end of an image-forming region of the photosensitive drum 119. The position outside the end of the image-forming region is a position where the light beam is incident on the light-receiving element 121 when the oscillator 117 has a first displacement angle.

Due to the oscillation angle (displacement angle) of the oscillator 117, a relationship shown in FIG. 2 between the position of the light beam with respect to time and the waveform of the drive signal is obtained. Referring to FIG. 2, a period t1 indicates a period from a time (first time information) when light is first incident on the light-receiving element 121 to a time (second time information) when light is next incident on the light-receiving element 121.

When the light beam is incident on the light-receiving element 121, the system controller 120 starts a counter 102 at 25 MHz. Next time light is incident on the light-receiving element 121, the system controller 120 causes a latch 103 to latch an output of the counter 102. Thus, the period t1 is obtained. An adder 104 subtracts a target value t10 from a value indicating the period t1 to determine a target value error $\Delta t1$.

The system controller 120 processes the target value error $\Delta t1$ using a coefficient unit 105 and an adder 106 to determine an amplitude A of the fundamental wave. A multiplier 113 multiplies a value of the amplitude A by the output of the drive-signal generating circuit including the trigonometric-function table 112. An output of the multiplier 113 is output to a digital-to-analog converter (DAC) 114. An output of the DAC 114 is transmitted to the drive coil 116 through an amplifier (AMP) 115, where the permanent magnet 1172 of the oscillator 117 is magnetically driven. The above-described generation of a drive signal is feedback-controlled to drive the oscillation system according to the drive signal having the target amplitude A. The drive coil 116 may be driven using, instead of the DAC 114, a circuit including a pulse width modulation (PWM) drive circuit and an H-bridge circuit by a digital pulse drive signal. In the case of driving by a pulse signal, the number of pulses, pulse interval, pulse width, or the like may be changed with time according to a sine-wave signal from the multiplier 113 to generate a desired drive signal.

While the drive unit is an electromagnetic drive unit including the drive coil 116 and the magnet 1172, a driving force may be applied to the oscillation system using an electrostatic or piezoelectric drive unit. In the case of electrostatic driving, at least one oscillator includes an electrode, and another electrode is formed in the vicinity of the oscillator so that an electrostatic force can be generated between the electrodes. In the case of piezoelectric driving, a piezoelectric element is provided for the oscillation system or the supporting unit, and applies a driving force. In the case of electromagnetic driving, an oscillator may include a drive coil, and a permanent magnet may be provided in the vicinity of the oscillator.

While the signal output device is implemented by the light-receiving element 121, the signal output device may be implemented by a piezoresistor. Such a signal output device is used as a displacement-angle measuring device. The term "signal output device", as used herein, also means a displacement-angle measuring device.

In a case where a displacement angle of an oscillator is used using a piezoresistor, for example, a torsion spring is provided with a piezoresistor. In response to a signal output from the piezoresistor, a time when the oscillator have a certain displacement angle is detected. The piezoresistor is manufactured by, for example, diffusing phosphorus in p single crystal silicon. The piezoresistor outputs a signal in accordance with a torsion angle of the torsion spring. Thus, the torsion spring is provided with a plurality of piezoresistors, and the displacement angle of the oscillator is determined on the basis of information obtained from the plurality of piezoresistors, whereby high-precision measurement of the displacement angle of the oscillator can be realized.

The operation of the drive control unit and drive unit of the first embodiment having the structures and functions described above will be described.

As shown in a flowchart of FIG. 3, when the optical deflection apparatus of the first embodiment is started (step 301), the system controller 120 turns on the LD 118 to start driving (step 302). Then, the target value t10 corresponding to the target amplitude of the oscillator 117, the predetermined variable F specific to the oscillator 117, the value of an initial amplitude IA for driving the oscillator 117, and an initial loop gain KA of 0 are set in a register 110. The variable F, which is added to an address in the address generator 111 for every clock of the system clock 101, is determined by the system controller 120 according to a target oscillation frequency (i.e., a resonant frequency) of the oscillator 117. The sine-wave table 112 is indexed by the output of the address generator 111, which uses the value of the variable F, and the oscillator 117 can therefore be driven at the resonant frequency.

Figures 7, 8:
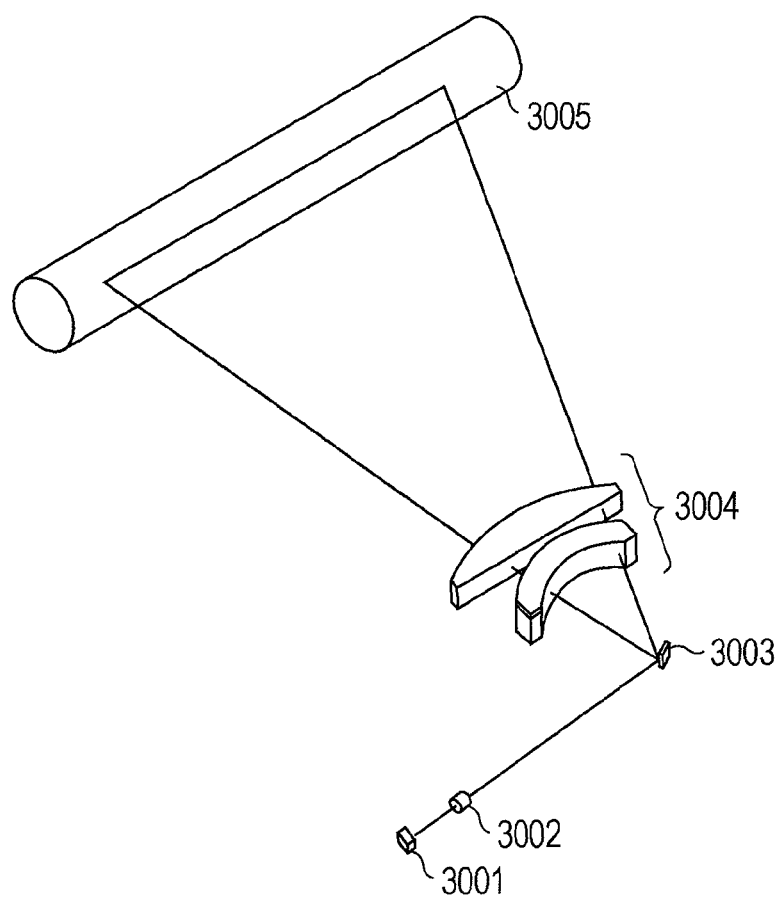
FIG. 7 is a diagram showing an example of a sine-wave table.
FIG. 8 is a perspective view of an optical apparatus including an optical deflection apparatus according to an embodiment of the present invention.

As a specific example, the system clock 101 is 25 MHz and the number of addresses in the sine-wave table 112 is 16 bits (65536 addresses) (FIG. 7 shows a table indicating values of the sine wave table 112 stored at those addresses). In this case, when the variable F of 4 is added each time and the sine-wave table 112 is indexed, a sine wave of a frequency determined by the equation below is obtained:

$$4*25000 \text{ kHz}/65536 = 1.52587890625 \text{ kHz}$$

In a similar manner, adding F=5 results in 1.9073486328125 kHz, and adding F=6 results in 2.288818359375 kHz. To obtain a frequency closer to 2 kHz, the number of addresses in the sine-wave table 112 is increased from 16 bits, or the address generator 111 is allowed to treat virtual decimal fraction numbers so that a virtual decimal fraction part after a decimal point is not connected to the sine-wave table 112. In the latter case, an allowance for reduction in precision is determined according to the mechanical Q-factor of the oscillator 117 or required jitter performance.

Figure 4:
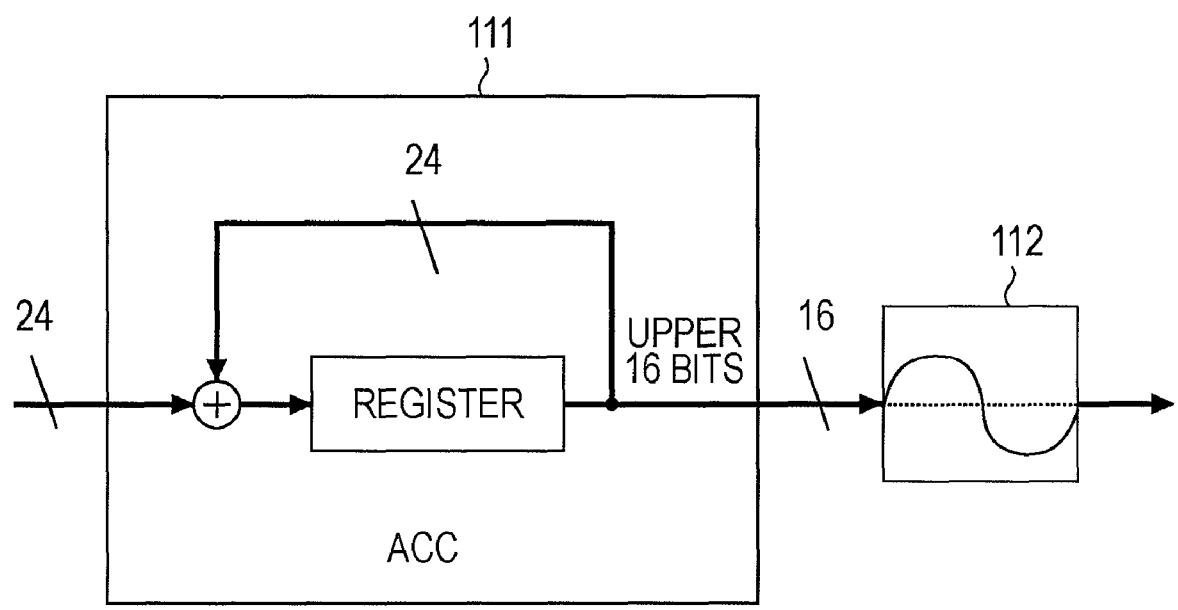
FIG. 4 is a diagram showing a sine-wave generation circuit having an 8-bit extended format after the decimal point according to a first embodiment of the present invention.

As an example, in an 8-bit extended format after the decimal point, converting 5.24288 into a 16-bit format before the decimal point and a 8-bit format after the decimal point results in a binary value for the bits of F=101.00111110. The resulting number is added to an address for every clock in the address generator 111. This number is expressed as F=5.2421875 in decimal notation. Substituting in the above equation with this number results in a frequency of 1.99973583221435546875 kHz, that is, approximately 2 kHz. FIG. 4 shows a structure of a sine-wave generating circuit having an 8-bit extended format after the decimal point according to the first embodiment.

Referring back to the flowchart of FIG. 3, the multiplier 113 multiplies the output of the sine-wave table 112 by the initial gain IA, which is output from the adder 106, and outputs the result to the DAC 114. Since the coefficient KA of the coefficient unit 105 is currently set to zero (0), the output of the adder 106 is equivalent to the initial gain IA. The output of the DAC 114 is applied to the drive coil 116 through the AMP 115 to magnetically drive the permanent magnet 1172 of the oscillator 117.

The oscillator 117 in which the permanent magnet 1172 is magnetically driven is movably supported to the unshown supporting unit by the torsion spring 1173. As the initial gain IA gradually increases, the oscillation amplitude increases. The light beam from the LD 118 is reflected at a gradually increasing angle accordingly by the mirror portion 1171 of the oscillator 117, and is finally incident on the light-receiving element 121. Then, as shown in FIG. 2, an output of the light-receiving element 121 having consecutive two pulses is obtained. The system controller 120 starts the counter 102 at the first pulse, and causes the latch 103 to latch the value of the counter 102 at the second pulse. Thus, the value of the period t1 is measured. When it is determined that the value of the period t1 exceeds a predetermined value and is substantially equal to the target value t10 (step 303 shown in FIG. 3), the value of the coefficient KA is set to a predetermined non-zero value, and feedback control is started (step 304). The non-zero value of the coefficient KA is determined in advance from various factors such as the characteristics of the oscillation system and a required control bandwidth.

A drive-signal generating method according to the first embodiment will be summarized. The drive-signal generating method can be used in an oscillation device including an oscillation system including an oscillator and a torsion spring, a drive unit configured to drive the oscillation system, and a drive control unit configured to control the drive unit using a drive signal expressed by an equation containing a periodic function. In this method, an address to which a predetermined variable is added at a frequency higher than a frequency of the drive signal is generated, and a trigonometric-function table is indexed on the basis of the address to generate a drive signal. A frequency of the periodic function of the drive signal is adjustable by adjusting the predetermined variable. More specifically, an address to which the predetermined variable is added at a frequency higher than a fundamental oscillation frequency f at which the oscillation system is movable is generated. The generated address is output to a trigonometric-function table, and the trigonometric-function table is indexed by the address to generate a drive signal $A \cdot \sin(2\pi ft)$. Alternatively, the drive signal may be generated as follows. The number of bits used to represent addresses in the trigonometric-function table is smaller than the number of bits used to represent the generated address, and the predetermined variable is expressed as a number having an integer part and a virtual decimal fraction part. A number corresponding to only the integer part of the added predetermined variable is output to the trigonometric-function table. As an angle position value corresponding to the number having an integer part and a virtual decimal fraction part, a value that is retrieved from the trigonometric-function table using the number corresponding to only the integer part as an address is used to generate a drive signal.

According to the first embodiment, instead of generating a drive signal from a detection signal of oscillation of an oscillator, a drive signal expressed by an equation containing a periodic function can be generated using an address generator and a trigonometric-function table in the manner described above. Thus, an oscillation system that is movable in a mode including a component of a resonant frequency can be feedback-controlled to a desired operation. In the first embodiment, furthermore, the predetermined variable is a number having an integer part and a virtual decimal fraction part, and the virtual decimal fraction part may be used as a part that affects an address value only when the virtual decimal fraction part is raised to the integer part. This provides flexible adjustment of a frequency of a generated sine wave without changing the operating clock and the number of bits in the trigonometric-function table. Therefore, superior frequency control characteristics can be achieved.

Second Embodiment

A second embodiment of the present invention will now be described. The second embodiment has a similar basic structure to the first embodiment. In the second embodiment, the bit precision (number of bits) representing the addresses in the trigonometric-function table 112 is smaller than the bit precision (number of bits) of the address generator 111. In the second embodiment, the value (amplitude) of an address is generated by interpolation from table values of addresses in the trigonometric-function table 112, which are preceding and following the number of the integer part of the address.

As described with reference to FIG. 4, the sine-wave generating circuit of the first embodiment is configured such that 8 bits after the decimal point are truncated. That is, the amplitude of the sine-wave table is indexed by an address of a truncated integer, and the value of this amplitude is set as an angle position value corresponding to a number including 8 bits after the decimal point. This method is effective in a case where a reduction in precision due to the sine-wave generation is acceptable.

Figure 5:
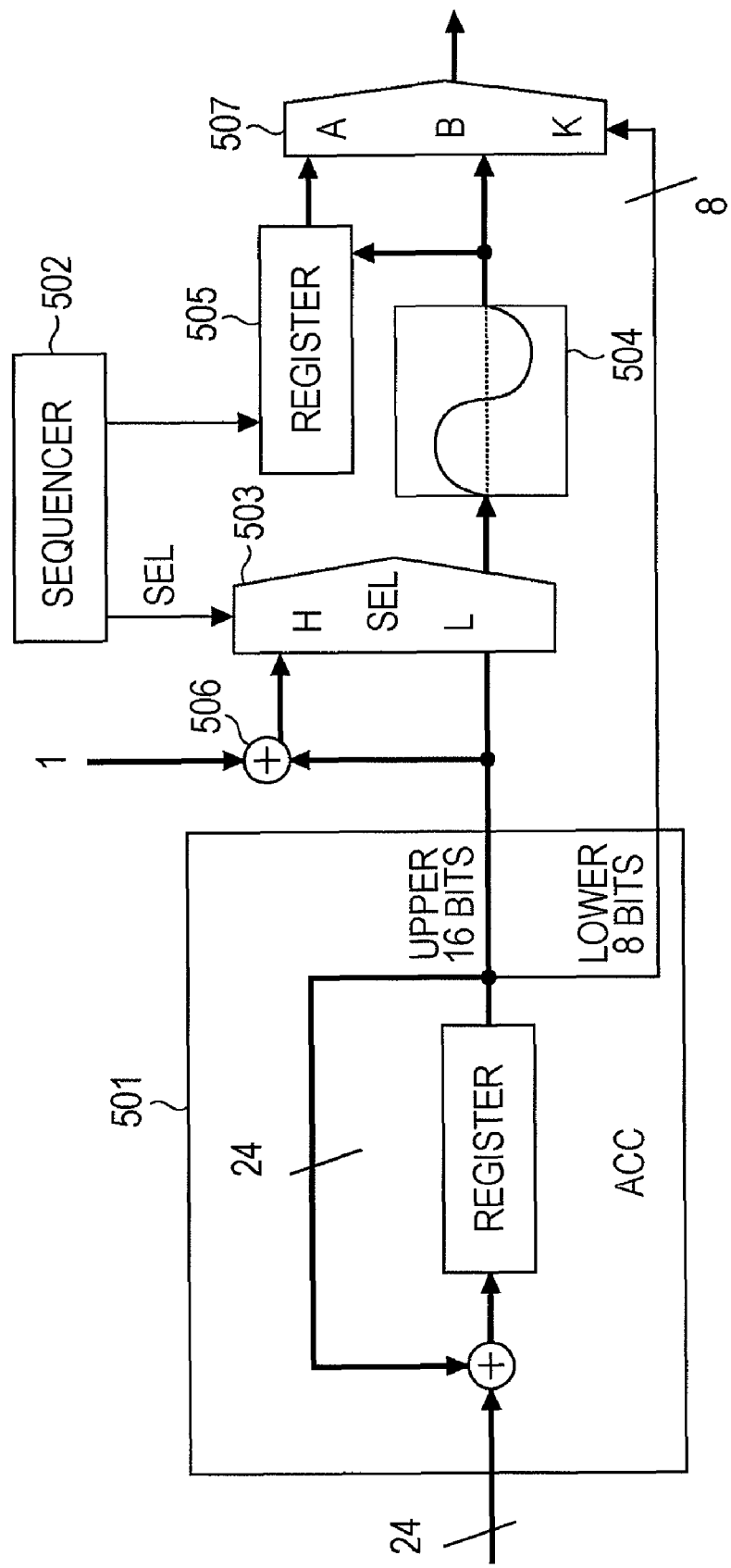
FIG. 5 is a diagram showing a high-precision sine-wave generating circuit having an 8-bit extended format after the decimal point according to a second embodiment of the present invention.

FIG. 5 shows a sine-wave generating circuit configured to generate a higher-precision trigonometric-function-based drive signal by using interpolation. The sequence of operations up to an operation of an address generator 501 is similar to that of the first embodiment.

In the structure of the sine-wave generating circuit of the second embodiment shown in FIG. 5, first, a sequencer 502 sets a value SEL of a selector 503 to low (SEL=L). Thus, the value of upper 16 bits from the address generator 501 passes through the selector 503 and is used to index a trigonometric-function table 504. A resulting value A is written in a register 505. Then, the sequencer 502 sets the value SEL of the selector 503 to high (SEL=H), and the trigonometric-function table 504 is indexed by the value of a following address to which one is added by an adder 506 to obtain a value B. Further, a weight adder 507 calculates a weighted average of the values A and B using a value K of the fraction part of the lower 8 bits.

The output of the weight adder 507 is represented by $K*B+(1-K)*A$, and an angle position value corresponding to a number including 8 bits after the decimal point is a value that is directly interpolated with values of addresses in the trigonometric-function table, which are preceding and following the integer part of the number. Therefore, higher-precision sine-wave generation can be achieved. While linear interpolation, which is the simplest method, has been described by way of example, a more sophisticated interpolation method, such as a cubic spline interpolation method using a cubic function, which is based on a total of four points, namely, addresses preceding and following an address by which the trigonometric-function table is indexed and addresses further preceding and following the addresses, can provide a higher-precision numerical value. A drive-signal generating method according to the second embodiment will be summarized. The number of bits used to represent addresses in the trigonometric-function table is smaller than the number of bits used to represent the generated address, and the predetermined variable is expressed as a number having an integer part and a virtual decimal fraction part. A number corresponding to only the integer part of the added predetermined variable is output to the trigonometric-function table. As an angle position value corresponding to the number having an integer part and a virtual decimal fraction part, a value that is obtained by interpolating values retrieved from the trigonometric-function table using integers preceding and following the number corresponding to only the integer part as addresses is used to generate a drive signal.

According to the second embodiment, in addition to the advantages of the first embodiment, the precision of the trigonometric function used can be improved. Therefore, the size of a read-only memory (ROM) of a trigonometric-function table required to achieve desired precision can be reduced, and the cost of a large scale integration (LSI) chip can also be reduced.

Third Embodiment

Figure 6:
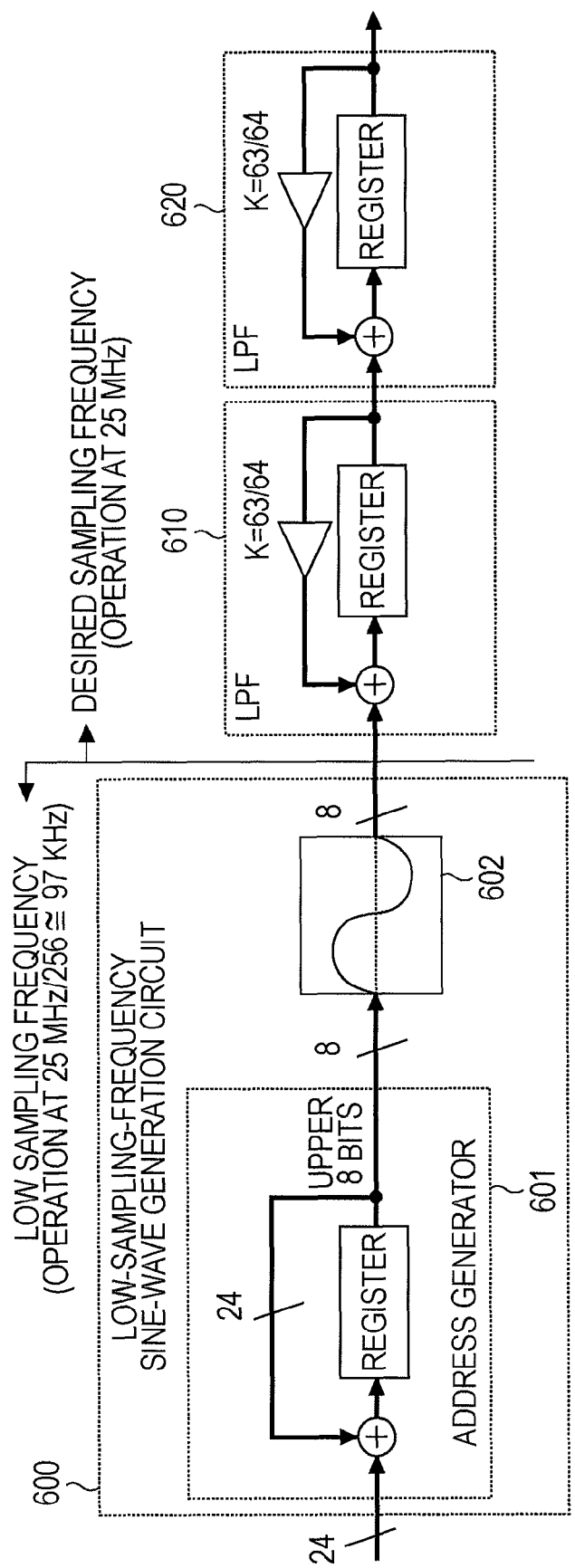
FIG. 6 is a diagram showing a structure of a sine-wave generation circuit according to a third embodiment of the present invention in which a signal is re-sampled and is transmitted through a low-pass filter (LPF).

A third embodiment of the present invention will be described with reference to FIG. 6. In the third embodiment, a circuit configured to transmit an output of a trigonometric-function table 602 through a low pass filter (LPF) having a sampling frequency higher than a sampling frequency (the number of operating clocks; operating frequency described below) of the trigonometric-function table 602 is used. In the example shown in FIG. 6, compared with the operation at 25 MHz in the foregoing embodiments, the operating frequency of the trigonometric-function table 602 is reduced to 25 MHz/256, i.e., approximately 97 kHz, and the output bits are 8 bits (that is, the number of addresses in the table is also represented by 8 bits). Two infinite impulse response (IIR) LPFs 610 and 620 each operating at 25 MHz are arranged after the trigonometric-function table 602. The operating frequency of an address generator 601 is also reduced to 25 MHz/256, i.e., approximately 97 kHz. Also with this structure, letting the predetermined variable F be 4 by way of example, a sine wave of a frequency represented by the equation below can be generated:

4*(25000 kHz/256)/256=1.52587890625 kHz

An output of a sine-wave generating circuit 600 having a low sampling frequency is updated at 25 MHz once every 256 times. The resulting value is transmitted through the two low pass filters, i.e., the LPFs 610 and 620, with the operation at 25 MHz to smooth a stepped waveform including a large number of harmonic components. Coefficients K of the LPFs 610 and 620 and the number of low pass filters depend upon the mechanical Q-factor, sub-resonance characteristics, control performance, etc., of the oscillator 117. The coefficient value shown in FIG. 6 (K=63/64) is merely an example.

The third embodiment is applicable to either the first or second embodiment. According to the third embodiment, the size of a ROM of a trigonometric-function table can be reduced and the operating frequency can also be reduced. Therefore, the cost and power consumption of an LSI chip can be reduced.

Fourth Embodiment

FIG. 8 is a schematic perspective view showing an example of an optical apparatus including an optical deflection apparatus according to a fourth embodiment of the present invention. The optical apparatus will be described in the context of an image forming apparatus by way of example. Referring to FIG. 8, the image forming apparatus includes an optical deflection apparatus 3003 of the present invention. In the fourth embodiment, the optical deflection apparatus 3003 linearly scans incident light. The image forming apparatus further includes a laser light source 3001, a lens or lenses 3002, an optical system 3004, and a drum-shaped photosensitive member 3005.

Laser light emitted from the laser light source 3001 is subjected to predetermined intensity modulation relating to the timing of deflection scanning of light. The intensity-modulated light is passed through the lens or lenses 3002 to the optical scanning system (optical deflection apparatus) 3003, where the light is linearly scanned. The scanned laser light is received by the optical system 3004 to form an image on the photosensitive member 3005.

The photosensitive member 3005 is rotated about a rotation axis in a direction perpendicular to a direction of scanning. The photosensitive member 3005 is uniformly charged by a charger (not shown), over which light is scanned to form an electrostatic latent image on a portion where the light is scanned. Then, a toner image is formed on an image portion of the electrostatic latent image by a developer (not shown), and is transferred and fixed to, for example, paper (not shown) to form an image on the paper.

An optical deflection apparatus of the present invention allows an oscillator to be oscillated by a drive signal with less harmonic distortion, and can be applied to an apparatus including an oscillation system having a sub-resonant frequency as a harmonic frequency thereof or an oscillation system having two or more oscillators each resonated even at second or third harmonic. Further, since a frequency of a periodic function of a drive signal is adjustable by adjusting the predetermined variable, a frequency of a generated drive signal can be flexibly adjusted. Accordingly, an optical deflection apparatus adjustable to a desired frequency can be used. The optical deflection apparatus can be driven at, for example, a high amplitude amplification factor, resulting in a reduction in the size and power consumption of the optical deflection apparatus. Further, an angular speed of deflection scanning of light over the photosensitive member 3005 may be substantially equal within a specification range. Further, superior optical scanning characteristics are realized using an optical deflection apparatus of the present invention, and an image forming apparatus capable of generating a sharp image can be achieved.

An optical deflection apparatus of the present invention includes a light source configured to generate a light beam, and the above-described oscillation device provided with an optical deflection element configured to deflect the light beam to an oscillator. This optical deflection apparatus can also be applied to an image display apparatus. The optical deflection apparatus includes an image display unit, and is configured to deflect light from the light source to cause at least a portion of the light to be incident on the image display unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-131352, filed May 17, 2007, which is hereby incorporated by reference herein in its entirety.

What is claimed is:

1. An oscillation device comprising:
an oscillation system including a torsion spring which defines a torsion axis, and an oscillator connected to the torsion spring and movable about the torsion axis;
a supporting unit configured to support the oscillation system;
a drive unit configured to drive the oscillation system so that the oscillator is oscillated in a manner expressed by an equation containing a periodic function; and
a drive control unit configured to supply a drive signal to the drive unit,
wherein the drive control unit includes a drive-signal generating circuit, the drive-signal generating circuit including
an address generator configured to generate an address to which a predetermined variable is added at a frequency higher than a frequency of the drive signal, and
a trigonometric-function table which stores trigonometric values at addresses thereof and which is indexed by an output of the address generator,
the drive control unit being configured to generate the drive signal using the address generator and the values stored in the trigonometric-function table, and
wherein a drive frequency of the drive signal is adjustable by adjusting the predetermined variable.

2. The oscillation device according to claim 1, wherein the oscillation system is configured to move at a fundamental oscillation frequency,
wherein the drive control unit is configured to apply a periodic driving force of the fundamental oscillation frequency to the drive unit, and
wherein the drive-signal generating circuit generates a drive signal given by $A \cdot \sin(2\pi ft)$, where f denotes the fundamental oscillation frequency, A denotes an amplitude, and t denotes time, using the address generator and the values stored in said trigonometric-function table indexed by an output of the address generator, the address generator being configured to generate an address to which the predetermined variable is added at a frequency higher than the fundamental oscillation frequency.

3. The oscillation device according to claim 1, wherein the number of bits used to represent addresses in the trigonometric-function table is smaller than the number of bits used to represent the address generated by the address generator,
wherein the predetermined variable is expressed as a number having an integer part and a virtual decimal fraction part,
wherein the address generator outputs a number corresponding to only the integer part of the added predetermined variable, and
wherein the drive-signal generating circuit of the drive control unit generates the drive signal using a value as an angle position value corresponding to the number having an integer part and a virtual decimal fraction part, the value being retrieved from the trigonometric-function table using the number corresponding to only the integer part as an address.

4. The oscillation device according to claim 1, wherein the number of bits used to represent addresses in the trigonometric-function table is smaller than the number of bits used to represent the address generated by the address generator,
wherein the predetermined variable is expressed as a number having an integer part and a virtual decimal fraction part,
wherein the address generator outputs a number corresponding to only the integer part of the added predetermined variable, and
wherein the drive-signal generating circuit of the drive control unit generates the drive signal using a value as an angle position value corresponding to the number having an integer part and a virtual decimal fraction part, the value being obtained by interpolating values that are retrieved from the trigonometric-function table using integers preceding and following the number corresponding to only the integer part as addresses.

5. The oscillation device according to claim 1, wherein the drive-signal generating circuit of the drive control unit further includes a low pass filter operable at a sampling frequency higher than a frequency at which retrieval is performed from the trigonometric-function table, and
wherein an output of the trigonometric-function table is transmitted through the low pass filter to generate the drive signal.

6. An optical deflection apparatus comprising:
a light source configured to emit a light beam; and
the oscillation device according to claim 1, the oscillation device including an optical deflection element configured to deflect the light beam to the oscillator.

7. An image forming apparatus comprising:
the optical deflection apparatus according to claim 6; and
a photosensitive member,
wherein the optical deflection apparatus deflects light from the light source, and causes at least a portion of the light to be incident on the photosensitive member.

8. An image display apparatus comprising:
the optical deflection apparatus according to claim 6; and
an image display unit,
wherein the optical deflection apparatus deflects light from the light source, and causes at least a portion of the light to be incident on the image display unit.

9. A drive-signal generating method for generating a drive signal in an oscillation device,
wherein the oscillation device includes:
an oscillation system including a torsion spring which defines a torsion axis, and an oscillator connected to the torsion spring and movable about the torsion axis,
a drive unit configured to drive the oscillation system, and
a drive control unit configured to control the drive unit by supplying a drive signal expressed by an equation containing a periodic function,
the drive-signal generating method comprising:
generating an address to which a predetermined variable is added at a frequency higher than a frequency of the drive signal; and
indexing a trigonometric-function table which stores trigonometric values at addresses thereof on the basis of the address to generate the drive signal.

10. The drive-signal generating method according to claim 9, wherein an address to which the predetermined variable is added at a frequency higher than a fundamental oscillation frequency at which the oscillation system is movable is generated, and
wherein the generated address is output to the trigonometric-function table and is used to index the trigonometric-function table to generate a drive signal given by $A \cdot \sin(2\pi ft)$, where f denotes the fundamental oscillation frequency, A denotes an amplitude, and t denotes time.

11. The drive-signal generating method according to claim 9, wherein the number of bits used to represent addresses in the trigonometric-function table is smaller than the number of bits used to represent the generated address,
  wherein the predetermined variable is expressed as a number having an integer part and a virtual decimal fraction part,
  wherein a number corresponding to only the integer part of the added predetermined variable is output to the trigonometric-function table, and
  wherein the drive signal is generated using a value as an angle position value corresponding to the number having an integer part and a virtual decimal fraction part, the value being retrieved from the trigonometric-function table using the number corresponding to only the integer part as an address.

12. The drive-signal generating method according to claim 9, wherein the number of bits used to represent addresses in the trigonometric-function table is smaller than the number of bits used to represent the generated address,
  wherein the predetermined variable is expressed as a number having an integer part and a virtual decimal fraction part,
  wherein a number corresponding to only the integer part of the added predetermined variable is output to the trigonometric-function table, and
  wherein the drive signal is generated using a value as an angle position value corresponding to the number having an integer part and a virtual decimal fraction part, the value being obtained by interpolating values that are retrieved from the trigonometric-function table using integers preceding and following the number corresponding to only the integer part as addresses.

* * * * *